Sept. 28, 1943. M. DESCOS 2,330,560
FRAME FOR CYCLES AND THE LIKE
Filed May 28, 1941 2 Sheets-Sheet 1
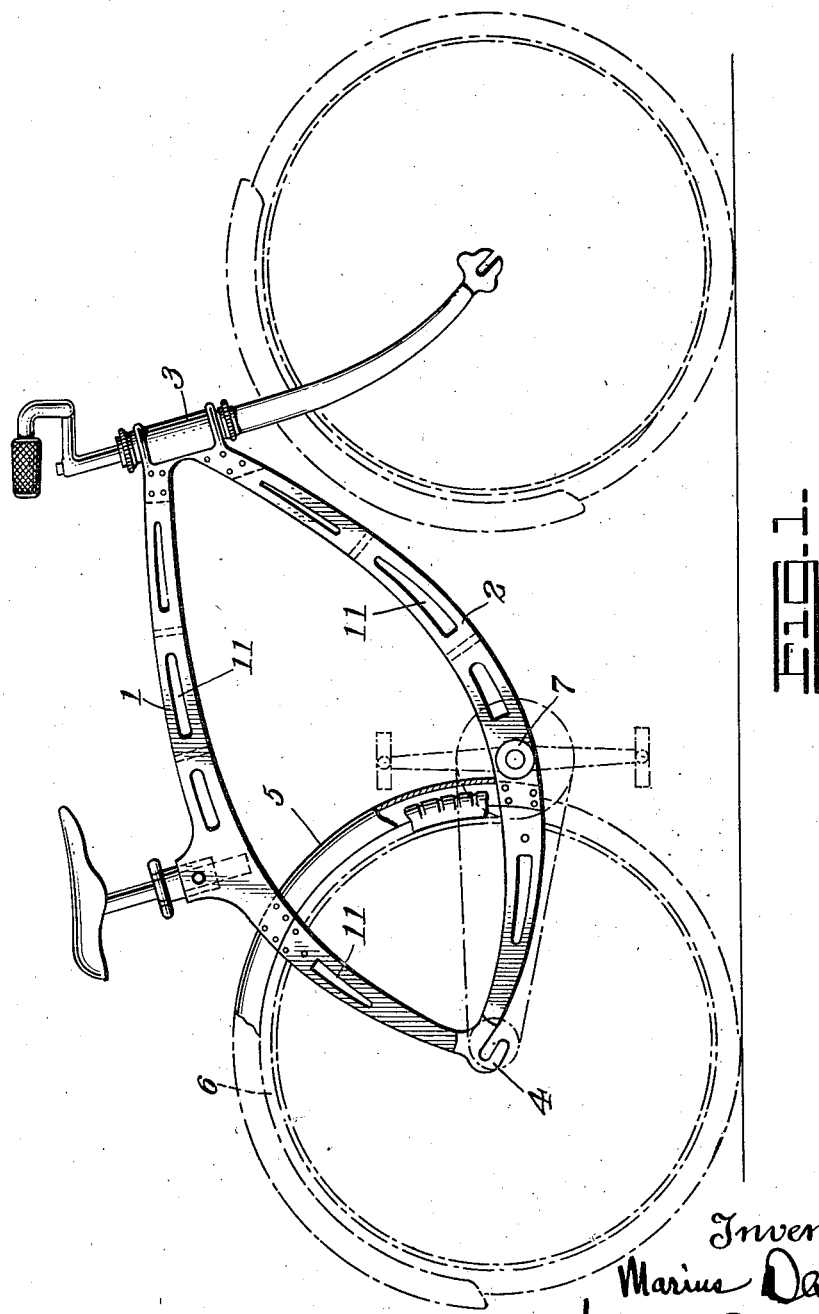
Inventor.
Marius Descos
By Alexander Dowell
Attorneys.

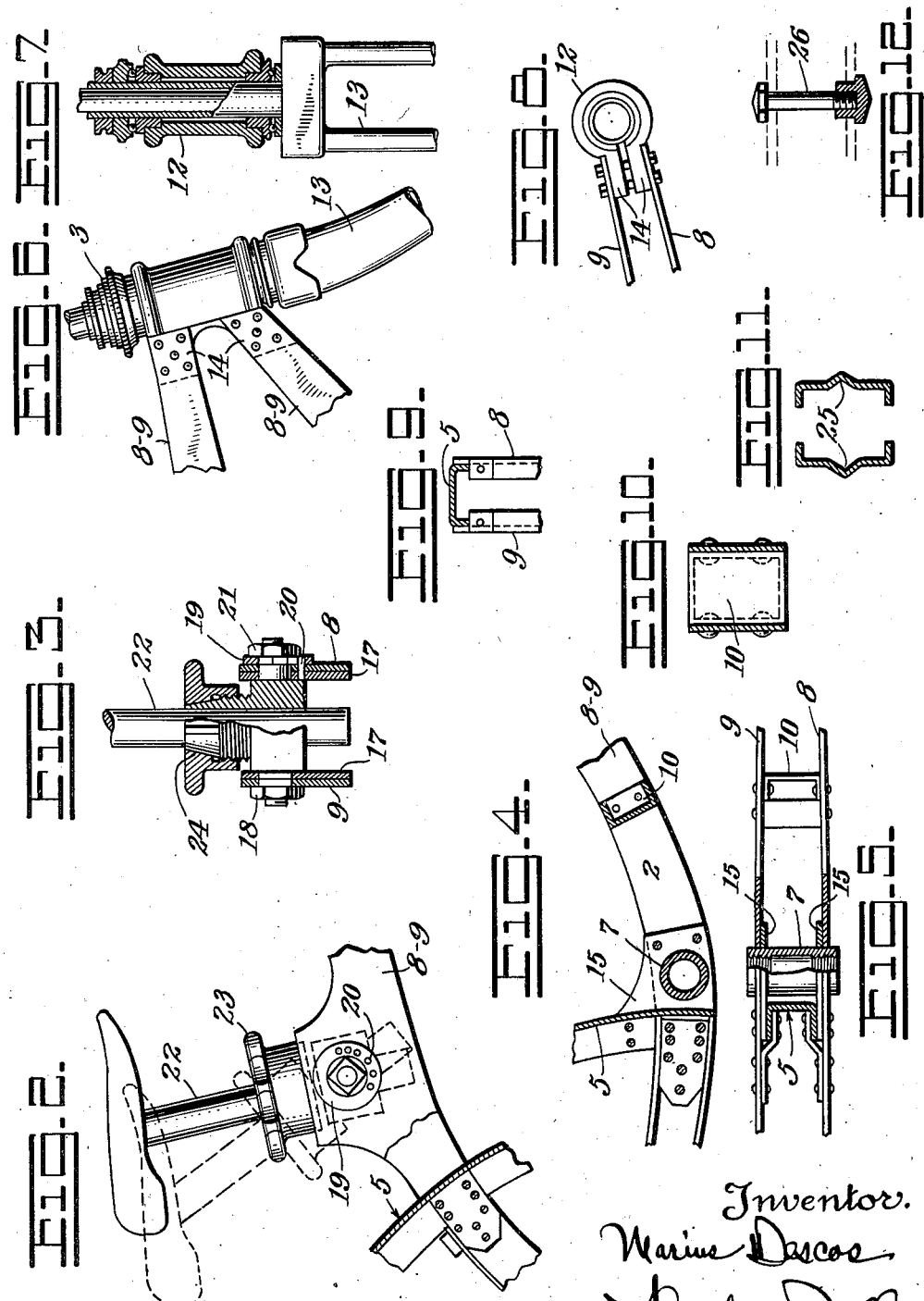

Patented Sept. 28, 1943

2,330,560

UNITED STATES PATENT OFFICE 2,330,560

FRAME FOR CYCLES AND THE LIKE

Marius Descos, Saint-Etienne, France; vested in the Alien Property Custodian

Application May 28, 1941, Serial No. 395,678
In France October 30, 1940

8 Claims. (Cl. 280—281)

My invention relates to frames for cycles and the like.

It has hitherto been customary to make frames for bicycles, motorcycles or the like by means of rectilinear tubes assembled together so as to form a triangular framework in a vertical plane.

In such frames the moment of resistance is not proportional to the bending moment in the vertical plane. The transverse moment of resistance is very low and the frame twists under the transverse torque resulting from pedalling. Due to the oblique tube extending from the saddle to the pedal hub, the rear wheel has to be disposed rather far backwards, which increases the total length of the cycle.

My invention has for its object to provide a cycle having a frame formed of two arcuate longitudinal members assembled by their ends in the vicinity of the rear wheel axle and at the hub of the steering fork, the said members being preferably re-inforced by a transverse member forming part of the rear mud-guard.

A further object of my invention is a cycle frame of the character described wherein each longitudinal member comprises two substantially flat elements slightly diverging from the steering fork to the rear wheel.

My invention also comprises a saddle support permitting to adjust the position of the saddle in height and also longitudinally of the frame.

In the annexed drawings:

Fig. 1 is a side view of a bicycle constructed in accordance with my invention.

Fig. 2 is an enlarged partial view showing the detail of the saddle support.

Fig. 3 is a transverse section thereof.

Fig. 4 is an enlarged partial sectional view showing the lower part of the frame.

Fig. 5 is a corresponding plan view with parts in section.

Fig. 6 is an enlarged partial view showing the front part of the frame.

Fig. 7 is a transverse section thereof.

Fig. 8 is a plan view thereof.

Fig. 9 is a diagram showing how the rear wheel brake may be fixed to the frame.

Fig. 10 is a transverse section showing a transverse connection between two longitudinal members.

Fig. 11 is a transverse section showing a modified construction.

Fig. 12 diagrammatically shows the connection of the longitudinal members of the frame by means of bolts.

The frame illustrated comprises two arcuate members 1 and 2 assembled by their ends, member 1 being curved upwardly while member 2 is curved downwardly. One end of each member 1 and 2 is fixed to the hub 3 of the steering fork, while the other end is fixed to the lugs 4 supporting the rear wheel axle. The frame thus obtained possesses a moment of resistance which substantially corresponds to the bending moment for each transverse section.

Members 1 and 2 are moreover connected by a curved U-shaped member 5 which forms a mud-guard for the rear wheel 6 while re-inforcing the frame between the saddle support and the pedal hub, as shown. Owing to its particular shape, member 5 is somewhat elastic and does not therefore impair the vertical elasticity of the frame as in the known constructions in which there is provided a rectilinear tube between the saddle and the pedal hub. It will also be observed that the pedal hub 7 may be disposed close to the rear mud-guard 5, which permits of reducing the total length of the frame with respect to the known constructions.

Each member 1 or 2 is made of two substantially flat elements 8 and 9 (Figs. 3, 5 and 8) disposed in spaced relation, the distance from each other increasing from the steering hub to the rear wheel axle. This arrangement provides a material transverse moment of inertia. Elements 8 and 9 are connected at spaced intervals by transverse members 10 (Fig. 10). They are preferably apertured as shown at 11 (Fig. 1) in order to reduce the total weight.

It will be understood that the construction described may easily be made of light metals or alloys.

The steering head, generally referenced 3 in Fig. 1 comprises a hub proper 12 (Figs. 6, 7 and 8) adapted to rotatably support the stem of a steering fork 13 of standard construction. Hub 12 is provided with wings 14 and it is longitudinally split in the plane of symmetry as clearly shown in Fig. 8. The fixed end rings of the steering gear which carry the ball races are thus firmly secured by the bolts assembling wings 14 and elements 8 and 9 to each other.

The pedal hub 7 is a steel tube welded or otherwise secured to two end plates 15, the latter being bolted or riveted with elements 8 and 9.

The saddle of the cycle (Figs. 2 and 3) is carried by a stem 22 driven through a block 16 provided with two opposed transverse trunnions rotatably supported by end plates 17 fixed to elements 8 and 9. On one side there is provided a nut 18 on the corresponding trunnion while on the other side there is provided a rotatable plate carried by a square portion on the end trunnion, the said plate being pressed against element 8 by a nut 21. Plate 19, which is preferably circular in shape, is provided with a circular row of holes adapted to co-act with a pin 20 engaged through plate 17 and element 8.

Stem 22 is locked in position by a nut 23 screwed co-axially to the same. Nut 23 carries an inner conical bore 24 engaging a split cone carried by block 16.

It will be grasped that nut 23 permits of adjusting stem 22 longitudinally, while the latter may be rocked about the axis of the end trunnions of block 16 and locked by pin 20 engaged through a hole of plate 19.

Elements 8 and 9, instead of being flat as shown in Fig. 10, may have their edges bent at 90° as shown in Fig. 11. They may also have a longitudinal stiffening depression as indicated at 25 in the cross-section of Fig. 11. The said depressions may be combined to produce a decorative effect.

The elements of the frame are preferably reinforced by appropriate brackets in the vicinity of their ends and they are assembled by means of special bolts 26 as shown in Fig. 12, the head of the bolt and the nut being identical in shape. Locking washers are used to prevent unscrewing.

The construction described permits of considerably reducing the total length of a bicycle. It may be used in connection with any kind of cycle such as tandems or motor-cycles. The arcuate member 5 forming a mud-guard and at the same time a transverse member of the frame may be applied with tubular frames.

It will be understood that the above description has been given only by way of example and that the details thereof may vary within the ambit of the appending claims.

I claim:

1. A frame for cycles and the like comprising a steering fork adapted to receive a front wheel; a steering tube wherein said fork is pivotally supported; a first arcuate member extending from the upper part of said steering tube substantially in a horizontal direction and ending at the rear in a substantially oblique and downward direction, said first member being formed of two flat substantially vertical elements in spaced mutual relation and slightly diverging from front to rear; a second arcuate member extending from the lower part of said steering tube in a substantially oblique and downward direction and ending at the rear in a slightly oblique and upward direction, said second arcuate member being also formed of two flat substantially vertical elements in spaced mutual relation and slightly diverging from front to rear; means adapted to receive a rear wheel axle, said means connecting with each other the rear ends respectively of the two right elements and of the two left elements of said first and second members; and an arcuate transverse member connecting said first and second arcuate members, said transverse member being substantially concentric to said means.

2. In a frame as claimed in claim 1, said transverse member forming a mud-guard for the rear wheel of the cycle.

3. In a frame as claimed in claim 1, said elements being formed with ribs.

4. In a frame as claimed in claim 1, said elements being formed with turned edges.

5. A frame for cycles and the like comprising a steering fork adapted to receive a front wheel; a steering tube wherein said fork is pivotally supported; a first arcuate member extending from the upper part of said steering tube substantially in a horizontal direction and ending at the rear in a substantially oblique and downward direction, said first member being formed of two flat substantially vertical elements in spaced mutual relation and slightly diverging from front to rear; a second arcuate member extending from the lower part of said steering tube in a substantially oblique and downward direction and ending at the rear in a slightly oblique and upward direction, said second arcuate member being also formed of two flat substantially vertical elements in spaced mutual relation and slightly diverging from front to rear; means adapted to receive a rear wheel axle, said means connecting with each other the rear ends respectively of the two right elements and of the two left elements of said first and second members; an arcuate transverse member connecting said first and second members, said transverse member being substantially concentric to said means; and a pedal hub passing through the two elements forming said second arcuate member, said hub being formed with lateral flanges by means of which it is secured to said elements.

6. In a frame as claimed in claim 5, said transverse member forming a mud-guard for the rear wheel of the cycle.

7. In a frame as claimed in claim 5, said elements being formed with ribs.

8. A frame for cycles and the like comprising a steering fork adapted to receive a front wheel; a steering tube wherein said fork is to be pivotally supported, said tube being formed with two pairs of wings extending rearwardly and said tube being split longitudinally between the wings of each pair; annular ball races engaged into the two ends of said steering tube to pivotally support said steering fork; two frame members each formed of two substantially vertical elements in spaced mutual relation, said members extending rearwardly from said steering tube; means to connect said members at the rear; and means to secure to said wings the front ends of said members, said last means tending to close the slit of said steering tube and to clamp said ball races in position.

MARIUS DESCOS.